Patented Aug. 1, 1950

2,516,844

UNITED STATES PATENT OFFICE 2,516,844

LUBRICANT COMPOSITION

John D. Bartleson, Cleveland, Ohio, assignor to The Standard Oil Company, Cleveland, Ohio, a corporation of Ohio No Drawing. Application July 9, 1946,
Serial No. 682,293

9 Claims. (Cl. 252—32.7)

This invention relates to compositions suitable as antioxidants or as lubricants and lubricant additives comprising reaction products of a phosphorus sulfide with an unsaturated non-tertiary amine. The lubricants comprising each reaction products are suitable for use under various conditions, including high temperatures or high pressures or both, as for instance, use in an internal combustion engine operating at higher temperatures and in which the lubricant is in close contact with metallic surfaces, metal compounds and high temperature gases, and use as gear lubricants when surfaces must be lubricated which are subject to high pressures.

The objects achieved in accordance with the invention include the provision of an agent which may be useful itself as a lubricant, and which, when added to lubricants, will markedly inhibit the very objectionable deposition of lacquer, acid and sludge formation, corrosion and other types of deterioration which tend to occur under operating conditions; the provision of lubricating oils containing such an addition agent; and other objects which will be apparent as embodiments are disclosed hereinafter.

In accordance with the invention, it has been found that a phosphorus sulfide may be reacted with an unsaturated primary or secondary, i. e., non-tertiary amine, preferably one having at least 12 carbon atoms in the molecule, and preferably at an elevated temperature, and the resulting reaction product will have good solubility in lubricating oils and greases. These reaction products have highly advantageous properties as additives for lubricants. They improve the corrosion, lacquer, sludge, viscosity increase, and the like characteristics of lubricating oils. Derivatives obtained from these sulfide-amine derived products, e. g., metal derivatives, nitrogen base derivatives, ester derivatives, or mixtures, or mixed derivatives thereof also have these desired properties.

The above reaction products may be used as antioxidants or stabilizers for organic materials which are subject to oxidative deterioration, e. g., elastomers, rubber, asphalt, plastic materials, paints, fats and fatty oils, gasoline, and the like.

The reaction temperature conditions vary somewhat with the particular non-tertiary unsaturated amine used, the amounts of the reacting components, and the characteristics wanted in the reaction product. The temperature should be high enough for the desired reaction to occur and not be so high as to decompose the reaction product. A reaction may occur at temperatures as low as room temperature but preferably at least a part of the reaction should be conducted at an elevated temperature, e. g., in the range of about 250° to about 600° F. or above, desirably above 400° F. and preferably in the range of 430° to 550° F., at atmospheric pressure, if the optimum properties are to be obtained in the reaction product. Economy of heat suggests that a temperature higher than that necessary to carry out the reaction will be wasteful.

The reaction time varies somewhat with the amine and the temperature and falls within the general range of from one minute to about six hours, desirably from about ¼ to about ¾ hours and preferably about ½ hour. The reaction is usually complete in four hours or less time. The reaction time is a function of the temperature, the amount of the sulfide that is to react, the subdivision of the sulfide, rate of stirring, etc. The reaction is somewhat exothermic and on a commercial scale the heat evolved thereby may be used to maintain the temperature. The ingredients may be added in increments if this is desirable for temperature control or for other reasons.

The sulfide-amine reaction may be carried out with direct admixture of the reactants, or by their admixture in the presence of a diluent which may or may not be subsequently removed. A volatile inert solvent, such as a saturated hydrocarbon boiling in the desired temperature range, may be used as a diluent which is to be subsequently removed. If a volatile solvent is used, it may be selected so as to have a boiling point that will assist in controlling the temperature if the reaction is carried out under reflux conditions. Alternatively, a heavier oil such as white oil, or a lubricating oil of about the same properties as that to which the new composition is to be added, may be used as a diluent which is not to be removed. In a commercial embodiment of the invention, a diluent probably would not be used unless it is a mineral oil, and a diluent is not necessary.

The unsaturated non-tertiary amines or mixture of amines may be reacted with the phosphorus sulfide or a mixture of phosphorus sulfides in a wide range of ratios; in a preferred embodiment at least about 0.5 mol of the sulfide is used per mol of the primary amine and about 1.0 mol of the sulfide per mol of the secondary amine. Amounts up to 2.6 mols of sulfide may be used. Even small amounts show a significant improvement. Generally, about 0.5 to about 1.6 mols of sulfide is the usual range that will be used.

The sulfide-amine reaction product may be prepared in two steps if desired: (1) reacting the unsaturated non-tertiary amine with about 0.5 mol of phosphorus sulfide per —C—N— group in the amine, and (2) subsequently reacting this product with from about 0.25 to about 1.25 mols of phosphorus sulfide per mol of olefinic double bond in the amine, (i. e. per

group). Preferably, at least one step should be conducted at an elevated temperature of about 200° to 350° F. or above. Alternatively, sufficient phosphorus sulfide may be used in the first reaction step for reacting with the amine functional group and also with the olefinic functional groups in the amine molecule.

The pentasulfide is preferred although other phosphorus sulfides or mixtures of sulfides may be employed. Phosphorus pentasulfide is most economic and readily available and for this reason is used in the illustrative examples. Under suitable conditions sulfides of arsenic or antimony may be similarly employed.

A large variety of unsaturated non-tertiary amines are suitable, for example, aliphatic, aromatic, or heterocyclic non-tertiary amines containing at least one olefinic double bond per molecule; all of these amines contain at least one amino hydrogen, i. e., a hydrogen bonded directly to the nitrogen. The choice may be controlled by the desired lubricant solubility characteristics of the sulfide-amine reaction product or a derivative thereof. The amine should not be so highly unsaturated or conjugated as to give reaction products which are not oil dispersible.

The preferred unsaturated non-tertiary amines contain an aliphatic radical of at least about 12 carbon atoms, and of these, those containing one olefinic double bond situated in a long chain radical are particularly preferred. The other constituents may be short chain aliphatic radicals of from about 1 to about 5 carbon atoms. Analogous unsaturated polyamines which contain at least one amino hydrogen attached directly to the nitrogen may be used. Mixed amines may be used, e. g., amines containing different types of radicals. Typical unsaturated non-tertiary amines are: mono- or di-octadecenyl, octadecadienyl, hexadecenyl, and hexadecadienyl amines, octadecenyl-methylamine, hexadecenyl-methylamine, tetradecenyl-methylamine, dodecenyl-methylamine, decenyl-methylamine, and the corresponding secondary amines wherein the methyl group is replaced by ethyl, propyl, butyl, or pentyl radicals, and the corresponding dienyl or trienyl amines.

The amine stock may be a mixture of different amines of different molecular weight and degrees of substitution. Saturated amines and other lower amines or nitrogen bases may be present. The amine stock need not be pure, provided that the major or essential component is the above unsaturated non-tertiary amine.

The process is preferably conducted so that the yield is very high and appreciable amounts of oil insoluble products are not formed. Generally, the amount of sulfide is chosen so that it will all react at the temperature selected, and the reaction is continued until it is consumed.

The sulfide-amine reaction products may be utilized in the form of their metal, nitrogen base or ester derivatives. Mixed derivatives or mixtures of the derivatives may be employed. These derivatives are formed from agents capable of replacing an acid hydrogen atom. Although the formation of the above derivatives may not involve replacement of acid hydrogen, the materials used as agents fall into the class of materials capable of replacing or reacting with acid hydrogen.

The metal derivatives may be formed from one or more metal compounds, such as their sulfides, oxides, hydroxides, carbides and cyanamides. These metals may be one or more of the following: an alkali metal, such as sodium, potassium and lithium; an alkaline earth metal, such as calcium, barium, strontium; or aluminum or other metal lower than aluminum in the electromotive series, such as zinc, lead, chromium, cobalt, antimony, arsenic, tin, copper or molybdenum. The metal should be selected with reference to the use of the composition and the properties desired in it. The alkali and alkaline earth metals have excellent detergent characteristics. The heavier metals have surface corrosion inhibition characteristics. The preferred metals are group I, group II and group III metals of the periodic table, such as potassium, zinc, barium and aluminum.

In the preparation of the above type metal derivatives, if the primary sulfide-amine reaction product was made at or heated to above about 400° F., as described heretofore, the reaction step of forming the metal derivatives may be carried out at temperatures in the range of about 100° to about 400° F., a temperature in the range of about 180° to 250° F. being preferred. This reaction is also usually completed in 4 hours or less time, and the same factors as to reaction time are involved as discussed heretofore. Alternatively, in a preferred embodiment, if the primary sulfide-amine reaction product has not been subjected to a temperature of at least about 400° F., the above type metal derivative may be prepared at or subjected to this higher temperature as described heretofore. A diluent may be used, as described heretofore, in making the metal derivatives, but is not necessary. If a diluent is used in the sulfide-amine reaction, it can be carried over into this reaction step and be subsequently separated if desired.

From about 0.25 to about 6.0 equivalents of the metal compound may be used per mol of the sulfide in the sulfide-amine reaction product, preferably about 1.0 to about 3.0 equivalents. An equivalent is the quotient of a mol divided by the valence of the metal concerned. The metal compound is generally insoluble in the sulfide-amine reaction product and the amount that reacts is the amount that is no longer present as a solid phase in the reaction mass.

The sulfide-amine reaction products may be converted to their nitrogen base derivatives by reaction with one or more basic nitrogenous compounds such as ammonia, amines, or heterocyclic nitrogen bases. Generally, ammonia and the gaseous or liquid amines or nitrogenous organic compounds are preferred. The organic nitrogen bases may be one or more of the following: mono-, di- or tri-alkyl, -aryl, or mixed alkyl aryl amines, wherein the alkyl or aryl groups may be methyl, ethyl, propyl, isopropy, butyl, isobutyl, secondary butyl, normal pentyl, a secondary pentyl, isopentyl, hexyl, cyclohexyl, phenyl, methylphenyl, a dimethylphenyl, a trimethylphenyl, or the like. The heterocyclic bases may be typified by pyridine, a lower alkyl substituted pyridine where the alkyl may be an ethyl, methyl, or propyl group, quinoline, isoquinoline, and the like. Analogous polyamines may be used similarly, e. g., ethylene diamine, di-ethylene triamine, and the like.

The reaction of forming the nitrogen base derivative of the primary sulfide-amine reaction product may be carried out at room temperatures or above, depending upon the boiling point or the melting point of the nitrogen bases used. In the case of a liquid nitrogen base, a higher temperature may be used although the temperature preferably should not be above the boiling point of the nitrogen base. For a normally solid nitrogen base, temperatures above its melting point are preferred, but the temperature should not be above the boiling point thereof. Atmospheric or elevated pressures may be used and in the case of the more volatile nitrogen bases, an elevated pressure is preferred. This reaction is also completed in 4 hours or less time and the same factors as to reaction time are involved as discussed heretofore. A diluent may be used as described heretofore but is not necessary. If a diluent is used in the sulfide-amine reaction, it may be carried over into this reaction step and may be subsequently separated if desired. In general, it is preferred to prepare the primary reaction product in one step, and to prepare its nitrogen base derivative in a separate step. However, if desired, a one-step process of preparing the final product may be used.

From about 0.25 to about 6.0 equivalents of the nitrogen base may be used per mol of the sulfide in the sulfide-amine reaction product, preferably about 1 to about 4 equivalents. An equivalent is the quotient of a mol divided by the valence of the nitrogen base concerned.

The ester derivatives may be prepared by reaction of the sulfide-amine reaction products with one or more alcohols, or thio-alcohols, or alkyl, aryl, cycloalkyl, and heterocyclic compounds containing an alcoholic or thio-alcoholic group. These alcohols may be illustrated by the following: methanol, ethanol, isopropanol, normal propanol, a butanol, a pentanol, an isopentanol, a cyclohexanol, a benzyl alcohol, phenyl ethyl alcohol, phenol, a methyl phenol, a polyalkyl phenol, an ethyl phenol, a diethyl phenol, alkoxy phenols, a methoxy phenol, a hydroxy pyridine, a hydroxy quinoline, a hydroxy isoquinoline, a hydroxy alkanolamine, ethanolamine, diethanolamine, triethanolamine, polyhydric alcohols, ethylene glycol, diethylene glycol, propylene glycol, glycerine, resorcinol, and (ring) alkyl substituted resorcinol, phloroglucinol, and the like alcohols, and the corresponding thiol alcohols or mercaptans. The word alcohol is used in its generic sense to include any of the above types of compounds. The alcohol used in forming the ester should be selected with reference to the use of the final composition and the properties desired in it.

The reaction of forming the ester derivatives may be carried out at temperatures in about the range of about 100° to 400° F., a temperature of 180° to 280° F. being preferred. This reaction is usually completed in 4 hours or less time, and the same factors as to reaction time are involved as discussed hereinbefore. A diluent may be used, as described hereinbefore, in making the ester derivative but a diluent is not necessary. If a diluent is used in the sulfide-amine reaction, it can be carried over into the reaction step of forming the ester derivative and be subsequently separated, if desired. From about 0.2 to about 6.0 equivalents of the esterifying agent may be used per mol of the sulfide in the sulfide-amine reaction product, preferably about 1.0 to about 4.0 equivalents. An equivalent is the quotient of a mol divided by the valence (e. g. number of alcoholic groups in the molecule) of the agent used.

It is beneficial to have water present in the reaction step of forming the metal or the nitrogen base derivative, and this may be introduced as water of crystallization, or as a hydrate of the metal compound or of the nitrogen base, or it may be introduced separately. A plurality of metals, or of nitrogen bases, or of esterifying agents, or mixtures of any two or more thereof, may be used, i. e., sodium and calcium, calcium and barium, calcium or zinc and aluminum or tin, ammonia, saturated or unsaturated aliphatic, naphthenic or aromatic or mixed nitrogen bases, esterifying agents or any one or more of the above nitrogen bases or alcohols. If the amount of the metal, nitrogen base or alcohol or combinations thereof, is small, the final product may be a mixture of the initial reaction product and the metal, nitrogen base or ester derivative. The yield in the reaction step of forming a derivative is very high.

After the preparation reaction step is complete, the reaction mass may be used directly as an additive, or preferably it is processed, e. g., centrifuged or filtered, to remove water and any traces of oil insoluble by-product substances. If an excess of the basic metal compound is used, the unreacted excess may be separated at this stage. If a solvent is used as a diluent, it may be removed by vacuum distillation at this stage.

The reactions may be carried out in the absence of air or in an atmosphere of a non-deleterious gas, such as nitrogen or H₂S.

These new compositions impart many desirable properties to lubricants to which they have been added. They act as very powerful detergents therein, and also as powerful inhibitors of corrosion and lacquer and sludge formation. They also improve the extreme pressure characteristics of lubricants.

The amount of the above described primary phosphorus sulfide-amine reaction product or derivative thereof to be added to an oil or grease will depend upon the characteristics of the oil or grease and the intended use. Some oils have more of a tendency to corrode metals, or to form acids, sludges and lacquer deposits than others, and such oils require larger quantities of the addition agent. Also oils that are intended for higher temperatures require larger amounts of the additive. In general, for lubricating oils the range is from 1 to 10% by weight but under some circumstances amounts as low as .01% show a significant improvement. There is no upper limit since the additive is a lubricant, but it may be uneconomical to add more than is necessary to impart to the lubricant the desired properties.

The following examples of the preparation of new compositions in accordance with the invention and tables of results of tests of lubricants comprising some of such compositions will serve to illustrate and point out some advantages but in no wise to limit the scope of the invention as otherwise disclosed and claimed herein.

*Example 1*

(a) In this example, a commercially available unsaturated primary amine containing about 45% (by weight) octadecenyl radicals and about 55% hexadecenyl radicals was used. The mixture contained about 0.345 mol of olefinic double bonds per mol of amine, on the average.

526 grams of this amine, 222 grams of phosphorus pentasulfide, 789 grams of No. 225 Red oil (a conventional acid treated Mid-Continent lubricating oil base stock of S. A. E. 20) and 789 grams of No. 300 Red oil (a conventional acid treated Mid-Continent lubricating oil base stock of S. A. E. 30) were mixed and heated at 500° F. in a nitrogen atmosphere for 30 minutes, with agitation. The reaction mass was filtered hot. The filtrate product 1 (a) was used as an additive in the test reported hereinafter.

(b) 223 grams of the above product 1 (a) was mixed with 13.4 grams of potassium hydroxide and 25.9 grams of water and heated for 2 hours on a steam bath. The resulting reaction mass was blown with air at 250° F. for 2 hours and then filtered hot. 230 grams of product 2 (b) was recovered as a filtrate. It analyzed 8.85 weight percent ash.

*Example 2*

(a) 266 grams of the amine described in Example 1, 122 grams of phosphorus sulfide, and 810 grams of No. 225 Red oil were mixed and heated at 500° F. in a nitrogen atmosphere for 30 minutes, with agitation.

51.2 grams of phosphorus sulfide were added to the above reaction mass, and the mixture heated at 350° F. for 8 hours more. The resulting reaction mass was filtered hot. This filtrate product 2 (a) was used as an additive in the tests reported hereinafter. It analyzed 6.34 weight percent S and 3.61 weight percent P.

(b) 239 grams of the above product 2 (a) was mixed with 14.8 grams of potassium hydroxide and 28.5 grams of water, and the mixture heated for 2 hours on a steam bath. The resulting reaction mass was blown with air at 200° F. for 1 hour and then at 250° F. for 2 hours. The reaction mass was filtered hot. The filtrate product 2 (b) analyzed 8.1 weight percent ash.

*Example 3*

266 grams of the amine described in Example 1, 173 grams of phosphorus sulfide and 810 grams of No. 225 Red oil were mixed and heated at 500° F. for 30 minutes. The reaction mass was filtered hot. No sludge was formed, and 1045 grams of filtrate product was obtained.

*Example 4*

A product was prepared in accordance with Example 2 (a). This was heated at 500° F. for 30 minutes and filtered hot to give a filtrate product, 4. No sludge was formed.

In order to demonstrate the properties of the sulfide-amine reaction products of the invention in improving the characteristics of lubricating oils, a number of the additives were incorporated into conventional lubricating oils. The lubricating oils containing these additives were submitted to the Sohio Corrosion test.

The Sohio Corrosion test is described in a paper by E. C. Hughes, J. D. Bartleson, M. L. Sunday, and M. M. Fink (which probably will be published in Industrial and Engineering Chemistry, Analytical edition, vol. 19). This paper also correlates the results of the laboratory tests with a Chevrolet Engine test.

Essentially the laboratory test equipment consists of a vertical thermostatically heated glass test tube (45 mm. outside diameter and 42 cm. long), into which is placed the corrosion test unit. An air inlet is provided for admitting air into the lower end of the corrosion unit in such a way that in rising the air will cause the oil and suspended material therein to circulate into the corrosion unit. The tube is filled with an amount of the oil to be tested which is at least sufficient to submerge the metals being tested.

The corrosion test unit essentially consists in a circular relatively fine grained copper-lead test piece of 1¼" O. D., which has a ¼" diameter hole in its center (i. e. shaped like an ordinary washer). The test piece has an exposed copper-lead surface of 3.00 sq. cm. Of this surface area, 1.85 sq. cm. acts as a loaded bearing, and is contacted by a part of the cylindrical surface of a hardened steel drill rod (¼" diameter and 1½" long, and of 51–57 Rockwell hardness).

The drill rod is held in a special holder, and the holder is rotated so that the surface of the drill rod, which contacts the bearing, sweeps the bearing surface (the drill rod is not rotated on its own axis, and the surface of the drill rod which contacts the bearing is not changed).

The corrosion test unit means for holding the bearing and the drill rod is a steel tubing (15" long and 1½" O. D.) which is attached to a support. A steel cup (1" long, 1½" O. D. by 1½" I. D.) is threaded into the steel tube, at the lower end. The cup has a ⅜" diameter hole in the bottom for admitting the oil into the corrosion chamber. The copper-lead test piece fits snugly into the steel cup and the hole in the test piece fits over the hole in the steep cup. A section of steel rod (⅜" in diameter and 19" long) serves as a shaft and is positioned by 2 bearings which are fixedly set in the outer steel tubing, one near the top and one near the lower (threaded) end thereof. Several holes are drilled just above and just below the lower bearing. The holes above the bearing facilitate cleaning the apparatus, while the holes below the bearing enable the circulation of oil through the corrosion chamber. The drill rod holder is connected to the shaft by a self-aligning yoke and pin coupling. This assures instantaneous and continuous alignment of the drill rod member against the bearing surface at all times. A pulley is fitted to the top of the steel shaft and the shaft is connected therethrough to a power source. The shaft is rotated at about 675 R. P. M.; and the weight of the shaft and attached members is about 600 grams, which is the gravitational force which represents the thrust on the bearing. The air lift from the air inlet pumps the oil through the chamber containing the test piece and out through the holes in the steel tubing.

The ratios of surface active metals to the volume of oil in an internal combustion test engine are nearly quantitatively duplicated in the test equipment. The temperature used is approximately that of the bearing surface. The rate of air flow per volume of oil is adjusted to the same as the average for a test engine in operation. Of the catalytic effects, those due to soluble iron are the most important. They are empirically duplicated by the addition of a soluble iron salt. Those due to lead-bromide are duplicated by its addition. The test was correlated with a slightly modified version of the L-4 Chevrolet test. This modification comprised reducing the oil additions from the 4 quarts in the usual procedure to 2 quarts, by reducing the usual 1 pint oil additions which are made at 4 hour intervals to ½ pint additions. This modification increases the severity of the test in its corrosion and detergency components, particularly in the case of border line oils.

For each test, the glass parts are cleaned by the usual chromic acid method, rinsed and dried. The metal parts are washed with chloroform and carbon disulfide and polished with No. 925 emery cloth or steel wool. A new copper-lead test piece is used for every test. The test piece is polished before use, on a surface grinder to give it a smooth finish. The test piece is weighed before and after the test on an analytical balance to evaluate the corrosion. After placing the oil and corrosion test unit in the tube, and bringing the assembly up to temperature in the thermostat, soluble catalyst is added and the air flow is started. Lead bromide catalyst is added immediately after starting the air, and timing of the test is begun.

The laboratory test conditions which were found to correlate with the modified Chevrolet procedure 36-hour test are shown in the following table.

Table A

Temperature, 325° F.
Oil sample, 107 cc.
Air flow rate, 70 liters/hour
Time, 10 hours
Catalysts, Steel; copper-lead bearing: 3 sq. cm. area of which 1.85 sq. cm. is a bearing surface; ferric 2-ethyl hexoate: 0.05% as $Fe_2O_3$ in C. P. benzene; lead bromide: 0.1% as precipitated powder
Bearing assembly:
  Load, 600 grams
  Speed, 675 R. P. M.

By extending the laboratory test to 20 hours, it was found that correlation with the modified Chevrolet 72 hour test could be obtained.

At the close of the test period, the extent of corrosion is determined by reweighing the corrosion test piece and determining the change in weight due to the test. An accurate evaluation of the lacquering properties of an oil is obtained by a visual rating system which is applied to the outer surface of the corrosion unit steel tube and metal cup in much the same way that the piston skirt, cylinder wall, etc. of an engine are rated for varnishes. The sludge rating of the engine is simulated by a visual rating of the insoluble materials and used oil which are coated on the glass test tube at the conclusion of the test. For both sludge and varnish rating a scale rating of A (best) to F (worst) is used.

A sufficient volume of used oil is obtained from the test for determination of the usual used oil properties, such as pentane insolubles, viscosity increase, and neutralization number.

The results given in the following table were obtained from the 20 hour Table A Sohio Corrosion test on a conventional solvent extracted lubricating oil base stock (S. A. E. 30) and compositions containing this oil and sulfide-amine reaction products of the invention were run for several of the additives. The results given in the following table are representative:

Table I

| Additive of Example No. | None | 1 (a) | 1 (b) | 2 (a) | 2 (b) | 3 | 4 |
|---|---|---|---|---|---|---|---|
| Concentration of Additive in per cent by weight | None | 1 | 1 | 1 | 1 | 1 | 1 |
| Corrosion (in milligrams weight loss) of Cu-Pb | 72.1 | 12.7 | 20.1 | 5.2 | 9.5 | 5.6 | 4.8 |
| Viscosity Increase (SUS) | 3,930 | 95 | 24 | 162 | 139 | 111 | 111 |
| Sludge Rating | A | x | x | A− | A | A− | A− |
| Lacquer Rating | A− | x | x | B+ | A | A− | A− |
| Neutralization Number | 7.7 | .87 | 1.5 | 1.7 | 1.4 | 1.6 | 2.4 |

These data show the marked improvement imparted to the lubricating oil by the sulfide-amine products of the invention. These marked improvements are particularly noteworthy since they are achieved with only 1% of the additives in the oil.

In order to prevent foaming of the oil containing a small proportion of the additive it is desirable in some cases to add a very small amount of tetra-amyl silicate, or an alkyl ortho carbonate, ortho formate or ortho acetate. 0.0003% of polyalkyl-silicone oil, or 0.001% of tetra-amyl silicate prevents foaming upon bubbling of air through oil containing a few per cent of the additive.

It will be obvious to one skilled in the art that sulfide-amine reaction products and similar products obtained by introducing phosphorus and/or sulfur into an amine as prepared according to different procedures but having substantially the same properties as those herein described, may be converted to derivatives or made up into lubricant compositions or both in accordance with the invention. The invention as claimed contemplates all such compositions except as do not come within the following claims.

I claim:

1. A lubricant comprising an oil dispersible reaction product of one mol of a hydrocarbon unsaturated non-tertiary amine containing a straight chain hydrocarbon radical having at least 12 carbon atoms and at least one olefinic double bond and at least above about 0.5 mol of phosphorus pentasulfide reacted at a temperature above 400° F. but below a temperature up to 600° F. at which the reaction product would be decomposed.

2. A lubricant comprising a mineral lubricating oil and an amount to improve the oxidation stability thereof of an oil dispersible reaction product of 1 mol of a hydrocarbon primary octadecenyl non-tertiary amine and at least above about 0.5 mol of phosphorus pentasulfide reacted at a temperature in the range of above 400 up to 600° F.

3. A lubricant comprising a mineral lubricating oil and an amount to improve the oxidation stability thereof of an oil dispersible reaction product of one mol of a hydrocarbon octadecenyl non-tertiary amine and at least above about 0.5 mol of phosphorus pentasulfide reacted at a temperature in the range of above 400 up to 600° F.

4. A lubricant comprising a mineral lubricating oil and an amount to improve the oxidation stability thereof of an oil dispersible reaction product of one mol of a hydrocarbon secondary octadecenyl amine and at least above about 1.0 mol of phosphorus pentasulfide reacted at a temperature in the range of above 400 up to 600° F.

5. A lubricant comprising a mineral lubricating oil and an amount to improve the oxidation stability thereof of an oil dispersible derivative of a reaction product of one mol of a hydrocarbon octadecenyl non-tertiary amine and at least above about 0.5 mol of phosphorus pentasulfide reacted at a temperature in the range of above 400 up to 600° F., said derivative being selected from the group consisting of a metal derivative, a nitrogen base derivative, and an ester derivative thereof.

6. A lubricant comprising a mineral lubricating oil and an amount to improve the oxidation stability thereof of an oil dispersible metal derivative of a reaction product of one mol of a hydrocarbon octadecenyl non-tertiary amine and at least above about 0.5 mol of phosphorus pentasulfide reacted at a temperature in the range of above 400 up to 600° F.

7. A lubricant comprising a mineral lubricating oil and an amount to improve the oxidation stability thereof of an oil dispersible potassium derivative of a reaction product of at least above 0.5 mol of phosphorus pentasulfide and one mol of a hydrocarbon unsaturated octadecenyl non-tertiary amine reacted at a temperature in the range of above 400 up to 600° F.

8. A lubricant comprising a mineral lubricating oil and an amount to improve the oxidation stability thereof of an oil dispersible barium derivative of a reaction product of at least above 0.5 mol of phosphorus pentasulfide and one mol of a hydrocarbon unsaturated octadecenyl non-tertiary amine reacted at a temperature in the range of above 400 up to 600° F.

9. A lubricant comprising in combination an oil of lubricating viscosity and 1 to 10% of the reaction product of at least above 0.5 mol of phosphorus pentasulfide and one mol of a hydrocarbon unsaturated non-tertiary amine containing a straight chain hydrocarbon radical having at least 12 carbon atoms and at least one olefinic double bond reacted at a temperature above 400° F. but below the decomposition point of the reaction product.

JOHN D. BARTLESON.

REFERENCES CITED

The following references are of record in the file of this patent:

UNITED STATES PATENTS

| Number | Name | Date |
|---|---|---|
| 2,242,260 | Prutton | May 20, 1941 |
| 2,403,474 | Bartleson | July 9, 1946 |
| 2,403,894 | Bartleson et al. | July 9, 1946 |